Figure 1:
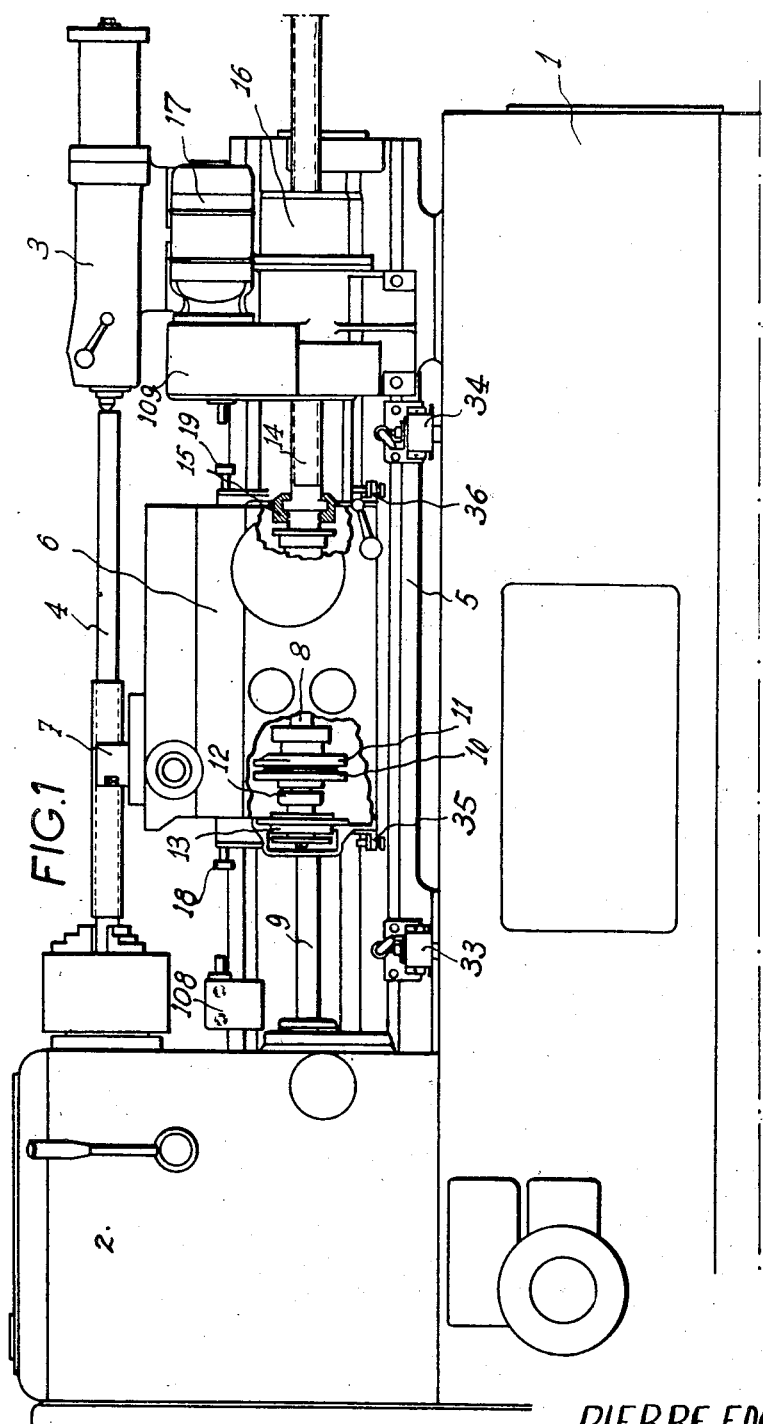

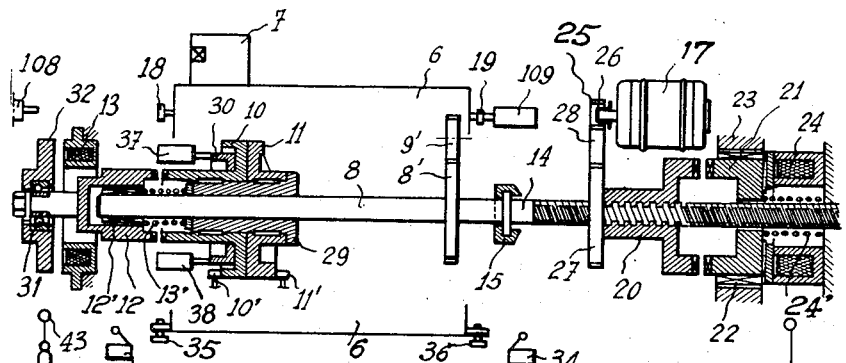
FIG.2
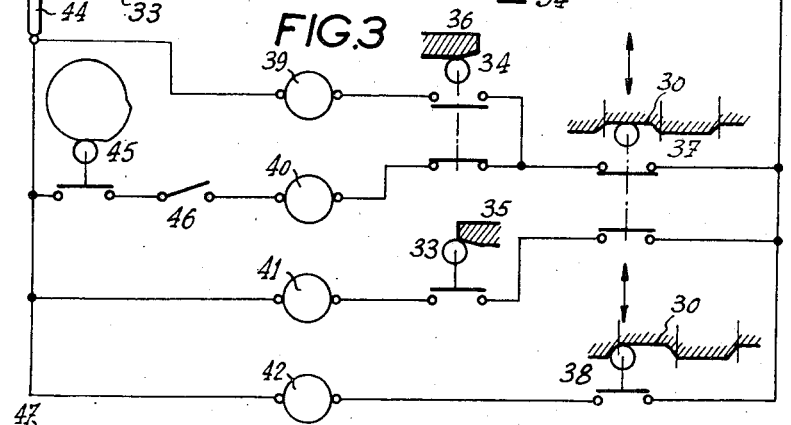
FIG.3
FIG.4
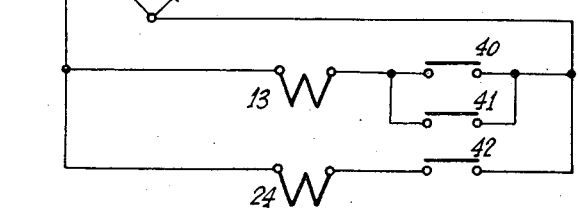
FIG.5
INVENTOR
PIERRE EDOUARD RENOUX
By Linton and Linton
ATTORNEYS

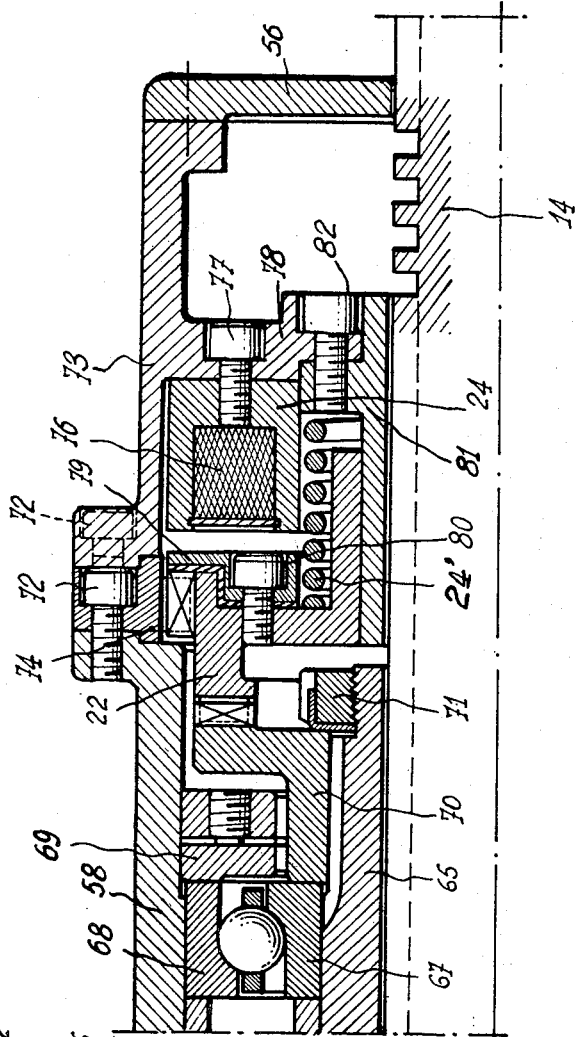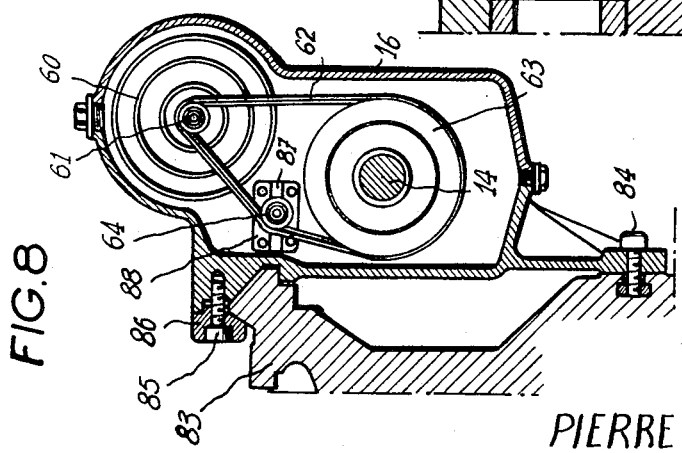

United States Patent Office 3,041,640
Patented July 3, 1962

3,041,640
THREAD CUTTING MACHINE WITH MEANS TO ENGAGE FEED SCREW MEANS
Pierre Edouard Renoux, Colombes, France, assignor to Cri-Dan, Paris, France, a company of France
Filed Aug. 5, 1959, Ser. No. 831,743
Claims priority, application France Sept. 12, 1958
22 Claims. (Cl. 10—105)

The present invention has for its object a thread-cutting machine of the type including a headstock, a tailstock, tool-holder and a bed over which may slide a carriage provided with a camshaft which is driven by the headstock and which carries along with it cams controlling the position of the tool-holder, as to depth of engagement, inward and receding movements and pitch defining the movements of the tool-holder.

It is well-known that such machines do not permit the producing of threads of a considerable length. The present invention has for its object to eliminate this drawback by providing the machine with members adapted to produce such threads and, to this end, the carriage is adapted to slide over the bed of the machine under the action of a master screw substituted for the pitch-controlling cam and cooperating with a nut fitted in a control box and adapted to be locked in position or else to be driven into rotation in the same direction as the master screw and at a higher speed, the depth-controlling cam and the cam controlling the inward and receding movements of the tool being fitted on a casing which may be disconnected with reference to the camshaft.

The present invention permits the production with a thread-cutting machine, either of conventional threads by resorting to the pitch-defining cam for the longitudinal movements of the carriage, in which case the carriage is rigidly secured to the bed, or else of threads of considerable length, the movements of the carriage over the bed being obtained in the direction of thread-cutting through a locking of the nut inside the control box. In this latter case, the rotation of the master screw with reference to the nut provides for a shifting of the carriage, to wit: in the direction of rearward rotation of the nut at a speed higher than that of the master screw with the control box being stationary with reference to the bed. During the thread-cutting and return stages, stoppage of the rotation of the cams controlling the engagement of the tool and the return movement is obtained furthermore through a disconnection of the camshaft with reference to the cam-carrying box.

According to a further object of the invention, the nut is held fast by an electro-magnetically controlled clutch, while its rotation is obtained by an electrical motor operating through torque-limiting means. It is thus possible to obtain a smooth operation of the thread-cutting machine, since this arrangement cuts out any jerks arising through the operation or stoppage of the driving motor, the only jerks which may arise being due to the engagement of the electro-magnetically controlled nut. The clutch adapted to hold the nut fast should ensure, for each locked position, a well-defined position for the carriage and is therefore a clutch providing a single position of engagement.

Preferably, the engagement and disengagement between the cam-carrying box and the camshaft are also ensured by a clutch which may be of a conventional type and is fitted at the end of the camshaft. The control of the two clutches may be advantageously obtained by two electromagnets subjected to the action of relays, one of said relays ensuring also the starting and the stoppage of the nut-driving power unit.

The relays in their turn are controlled by micro-switches of which two are controlled by the end of the forward stroke of the carriage and of its rearward stroke respectively while two other micro-switches are controlled by an auxiliary cam rigid with the cam-carrying box.

Lastly, according to a further improvement, the control box is positioned adjustably on the machine bed longitudinally thereof.

Figure 6:
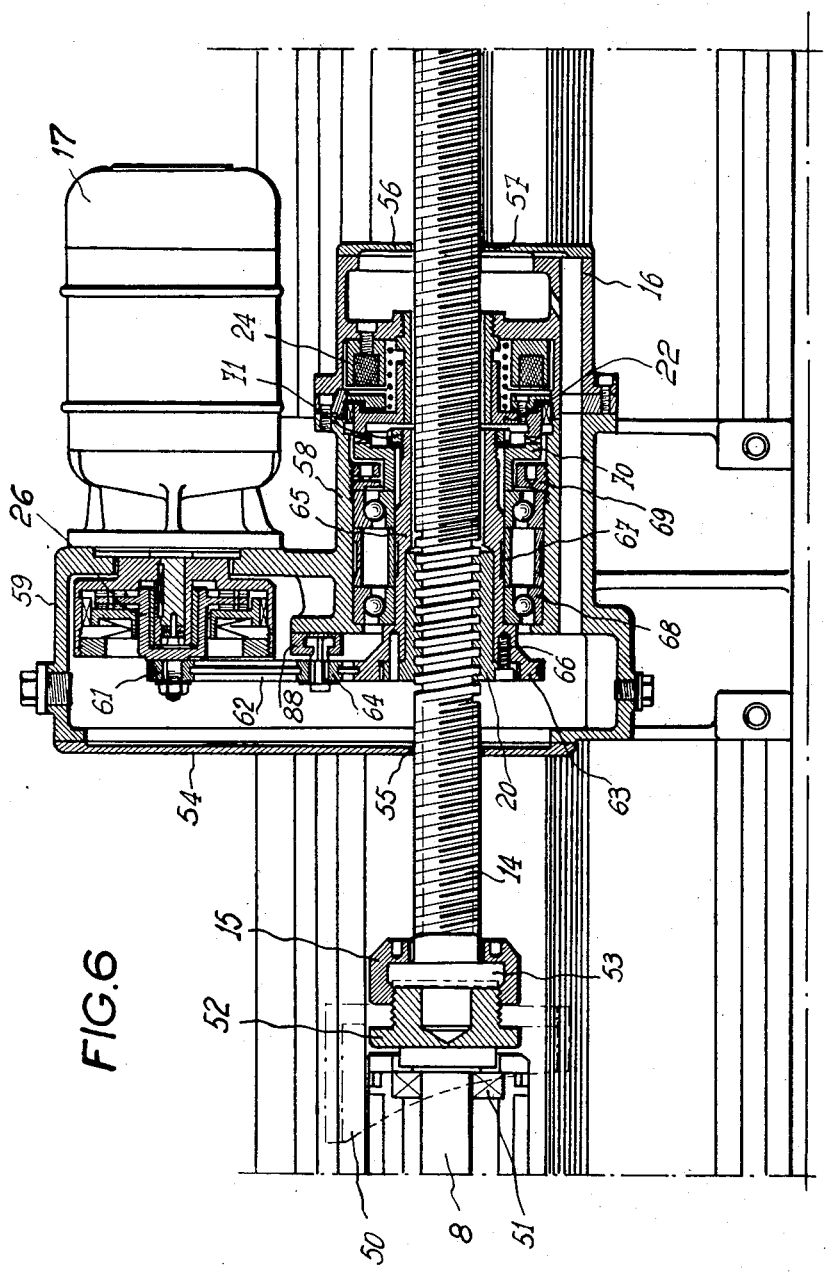
Figure 9:
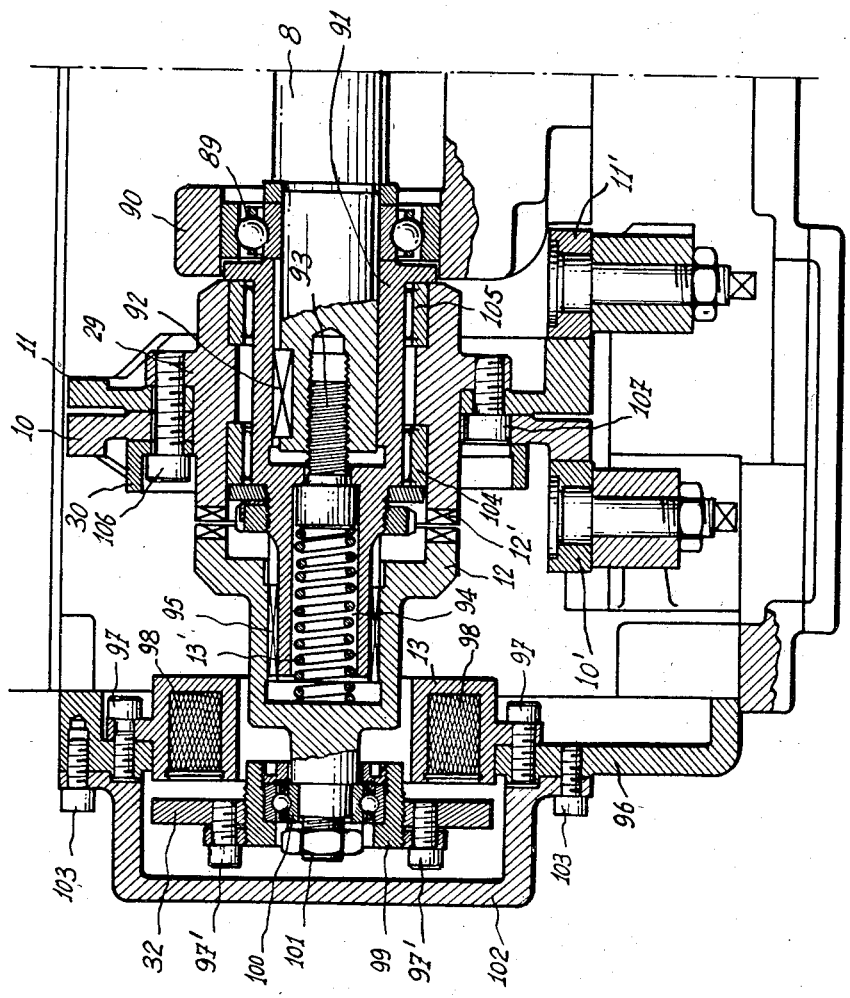

The invention will be readily understood upon reading of the following description, reference being had to the accompanying drawings illustrating, by way of example and by no means in a limiting sense, a preferred embodiment of the invention. In said drawings:

FIG. 1 is a side view of said embodiment.
FIG. 2 is a diagrammatic view of certain elements of said embodiment.
FIG. 3 is a wiring diagram showing the relay-controlling means.
FIG. 4 is a wiring diagram of the electro-magnet circuits.
FIG. 5 is a diagram of the movements of the tool-holder.
FIG. 6 is a view on a larger scale of the control box.
FIG. 7 is a view on a still larger scale of the nut-controlling clutch.
FIG. 8 is a cross-section showing the arrangement of the motor driving the nut.
FIG. 9 is a cross-section showing the clutch system for the cam-carrying box.

Turning first to FIG. 1, it is apparent that it shows a thread-cutting machine, to the frame 1 of which are secured in a conventional manner a headstock 2 and a tailstock 3, between which stocks is held the piece of work 4 in which a thread is to be cut.

The bed 5 of the machine forms a support for the carriage 6 on which is mounted the tool-holder 7. In said carriage is revolubly mounted a camshaft 8 driven into rotation by the headstock through the agency of a shaft 9 and of a gearing which is not illustrated and which allows a longitudinal movement of the carriage.

The camshaft 8 drives in its turn the cams 10 and 11 controlling respectively the depth of engagement of the tool with reference to the work and the inward and receding movements of the tool with the interposition of a clutch 12 controlled by the electromagnet 13.

On the other hand, the end of the camshaft carrying in conventional machine-tools the pitch-controlling cam carries a master screw 14 held in position by a locking nut 15, said master screw passing through the control box 16 carrying the driving motor 17. The carriage is provided with conventional means which are not illustrated, which allow securing it rigidly to the bed. The control box 16 may also be shifted longitudinally and locked in position on the bed. Adjustable feelers 35 and 36 are mounted on the carriage, so as to cooperate with the micro-switches 33 and 34 secured at longitudinally adjustable positions on the bed and the operation of which will be disclosed hereinafter. Shock-absorbers 108 and 109 are also secured to the bed in a longitudinally adjustable position for cooperation with the adjustable stops 18 and 19 secured to the carriage, whereby a gradual stoppage of the latter is obtained at the end of its forward and rearward travel.

It should first be remarked that if the pitch-controlling cam is fitted at the end of the camshaft 8 instead of the master screw 14 and locking nut 15 and if, on the other hand, the carriage 6 is rigidly secured to the bed 5 of the machine, the latter may operate under the normal operative conditions of a thread-cutting machine of the above-defined type.

In contradistinction, the operation of the machine after removal of the pitch-controlling cam and positioning of the master screw 14 locked by the nut 15 will be described hereinafter with further detail, reference being made more particularly to FIGS. 2 to 5.

Turning now to FIG. 2, it is apparent that the latter illustrates diagrammatically the elements providing operation of the machine for cutting threads in parts of a considerable length. Said FIG. 2 shows again the camshaft 8, the cams 10 and 11 controlling the depth of engagement of the tool and the inward and receding movements of the tool respectively through cooperation with the corresponding cam followers 10' and 11'. FIG. 2 also shows the clutch 12 and the electro-magnet 13, the master screw 14 and its locking nut 15. A section of the carriage body 6 and tool-holder 7 is also shown diagrammatically.

On the other hand, the master screw 14 cooperates with a nut 20 fitted in the control box and adapted to be locked against rotation by a dog clutch 21 sliding through the agency of the splines 22 with reference to the frame 23 of the control box. Said dog clutch is controlled by an electro-magnet 24 against the action of a spring 24'. The nut 20 can be driven into rotation by the motor 17 mounted on the control box and the drive of which is ensured through the agency of a pulley 25 with the interposition of a torque-limiting device illustrated diagrammatically at 26, said pulley 25 being connected to pulley 27 by a silent chain 28. The cams 10 and 11 are mounted on a cam-carrying box or sleeve 29 which also carries an auxiliary cam 30, while the electro-magnet 13 controlling the dog clutch 12 acts through the agency of its armature 32 fitted endwise on said clutch member 12 with the interposition for instance of a roller bearing, so as to be freely revoluble with reference to the dog clutch and to move translationally in unison therewith. There is provided furthermore a drive through the grooves 12' between the clutch member 12 and the shaft 8, a spring 13' urging the clutch member 12 back into its inoperative position.

FIG. 2 also shows the two switches 33 and 34 controlled by the feelers 35 and 36 on the carriage 6, while the switches 37 and 38 are controlled by the auxiliary cam 30.

The shock absorbers 108 and 109 and the adjustable stops 18 and 19 cooperating therewith are also shown in FIG. 2. Lastly, FIG. 2 illustrates diagrammatically the driving means for the shaft 8 constituted by two gearwheels 8' and 9'.

The wiring diagram of FIG. 3 includes four relays 39, 40, 41 and 42 fed from a supply illustrated by the terminal 43 with the interposition of a fuse 44.

The relay 39 which provides for the starting of the motor 17 is controlled by the micro-switches 34 and 37. The relay 40 controlling the electromagnet 13 is governed by a safety clutch-controlling cam 45, a cycle-interrupting switch 46 and the micro-switches 34 and 33. The relay 41 which also ensures the control of the electromagnet 13 operates under the control of the microswitches 33 and 34. Lastly, the relay 42 controlling the electro-magnet 24 operates under the control of the microswitch 38. In FIG. 3 is illustrated in its developed condition the cam 30 registering with the switches 37 and 38 and the stops 35 and 36 are also shown above the switches 33 and 34.

FIG. 4 illustrates more particularly the circuit feeding the electro-magnets 13 and 24. It is apparent that these electro-magnets are fed starting from the feed circuit illustrated by the terminals 47 and 48 through a rectifier 49 and through the agency of the relays 40 and 41 for the electro-magnet 13 and of the relay 42 for the electro-magnet 24.

The operation of the thread-cutting machine will be described with reference to FIG. 5 which illustrates a cycle of operation of the working tool. As apparent from inspecton of said FIG. 5, the working cycle of the tool includes a stage AB for engagement with the piece of work followed by a thread-cutting stage BC, a receding stage CD and a returning stage DA.

It should be first remembered that the cam 10 controlling the depth of engagement includes a boss controlling, during the receding period, a shifting of the transverse carriage which is equal to the depth of the subsequent cut to be executed, while the cam 11 is designed so as to give the transverse tool-holder a shifting towards the center of the machine before the thread-cutting stage and a reverse shifting before the return movement of the carriage.

On the other hand, when the dog clutch is disconnected with reference to the cam-carrying box 29, said box is held fast against rotation, whereas it revolves with the camshaft when the dog clutch engages the box. Lastly, the thread of the master screw 14 is such that when the nut 20 is held fast by the clutch 21, the rotation of said master screw produces a shifting of the carriage towards the left-hand side of FIG. 2, whereas, when the nut 20 rotates in the same direction as the master screw and at a speed clearly higher than that of the latter, this produces a movement at a higher speed of the carriage towards the right-hand side of FIG. 2.

It will now be assumed that the elements of the thread-cutting machine occupy the position illustrated in FIGS. 2, 3 and 4, which corresponds to the inoperative position of the machine for which the carriage is located on the right-hand side of the figures, the upper transverse carriage being at a distance from the work in which a thread is to be cut and the motor 17 being stopped. This position corresponds to the point A' of FIG. 5. The motor driving the machine is then started and the camshaft is disconnected. Upon operation of the safety clutch-controlling cam 45, the switch 46 being closed, the operation of said cam has for its immediate result the energization of the relay 40 which produces, through the agency of the electro-magnet 13, a rotation of the cams 10, 11 and 30. In particular, the cam 11 acts on the transverse carriage and urges the tool-holder inwardly into the position required for the first cut and corresponding to the point B of FIG. 5.

The auxiliary cam 30 produces then a closing of the microswitch 38, and, consequently, an energization of the relay 42 which has for its result, through the agency of the electro-magnet 24 controlling the clutch 21, a holding fast of the nut 20 against rotation. The master screw produces thus a progression of the carriage. At the same time, the auxiliary cam 30 produces the opening of the microswitch 37 and, thereby, a release of the dog clutch 12 through deenergization of the electro-magnet 13. This produces the simultaneous stoppage of the rotation of the cams 10 and 11. The corresponding stage, to wit: the shifting of the carriage from the right-hand side to the lefthand side with the cams 10 and 11 forms the thread-cutting stage corresponding to the path BC of the tool-holder shown in FIG. 5.

At the end of said path BC, the microswitch 33 controls the energization of the relay 41, and, consequently also, the engagement of the clutch 12 through energization of the electro-magnet 13. This leads to a further rotation of the cams, the cam 11 producing a receding movement of the transverse carriage and tool, while the cam 10 controls a shifting of the transverse carriage equal to the depth of engagement of the following cut. At the same time, the auxiliary cam 30 opens the micro-switch 38 and, consequently, through the agency of the relay 42, the dog clutch 21 is released and the carriage stops. This produces the movement CD of the tool-holder.

At the end of the movement CD, the cam 30 produces through the micro-switch 37 the deenergizaiton of the relay 41 and, consequently, a stoppage of the cams, together with the energization of the relay 39 and, consequently, a starting of the motor 17. The nut 20 driven by the motor 17 at a high speed produces therefore the high speed return movement of the carriage, which corresponds to the stage DA of the movement of the toolholder.

At the end of the stage DA, the micro-switch 34 switches off the energization of the relay 39 and stops consequently the motor 17 and the carriage. It controls also the energization of the relay 40 and, thereby, the engagement of the dog clutch 12, which leads to a starting of the cams into rotation. The second thread-cutting cycle begins then with the stage AB.

When the desired number of thread-cutting cycles has been executed, the micro-switch 33 controls, during the last cutting stage the engagement of the dog clutch 12 through the agency of the relay 41 and of the electromagnet 13, which has for its result a rotation of the cams. The cam 11 produces then a return movement of the transverse carriage, while the cam 10 releases the threadcutting mechanism and acts on the clutch-controlling cam 45 and the machine is thus stopped. On the other hand, the auxiliary cam 30 produces, through the agency of the micro-switch 38 and of the relay 42, a release of the dog clutch 21 and also, through the agency of the micro-switch 37 and of the relay 41, the release of the dog clutch 12 and, through the agency of said micro-switch 37 and of the relay 39, a starting of the motor 17. This produces a speedy return movement of the carriage, at the end of which the micro-switch 34 deenergizes the motor 17 through the agency of the relay 39, so that the carriage stops. The machine has thus returned into its starting position A', ready for a further series of cycles of operation.

It is found that for the movements considered as a whole, there is no sudden reversal of the direction of movement at any movement, since the master screw 14 always revolves in the same direction, the nut operating only when the carriage is at a complete standstill.

The operation of the thread-cutting machine according to the present invention is consequently very smooth, which is of a considerable interest from the standpoint of the life of the parts and of an easy service of the machine.

A detailed embodiment will now be described by way of example, reference being made to FIGS. 6 to 9 illustrating such an embodiment of the mechanisms described briefly with reference to FIGS. 1 and 2.

FIG. 6 illustrates on an enlarged scale and cross-sectionally the control box 16 carrying the motor 17, together with the master screw 14 and the means for securing the latter to the camshaft 8.

It is immediately apparent that instead of the pitch-controlling cam 50 illustrated in dot-and-dash lines, there is fitted endwise on the camshaft 8 resting in the cam-carrying box with the interposition of a roller bearing 51, a safety counter nut 52 over which is screwed the nut 15 adapted to hold fast against the counter nut 52 the head 53 of the master screw 14. The latter enters the control box 16 through its front wall 54, which is provided with a suitable opening 55 and it passes out of said box through its rear wall 56, also provided with an opening 57 for this purpose.

The control box 16 includes two sections, of which the horizontal section 58 encloses the nut 20, the dog clutch 22 and the electro-magnet 24, while the other, vertically extending section 59 encloses the transmission between the nut 20 and the motor 17. Said transmission operates preferably through the agency of the torque-limiting device designated generally by the reference number 26 and which transmits energy, from the motor 17 mounted on the box section 59 to a pulley 61 driving a silent chain 62 transmitting said energy, to a further pulley 63 coaxially rigid with the nut 20, with the interposition of tensioning means 64.

The torque-limiting means 26 which may be of any conventional type are of a considerable importance for the operation of the machine, chiefly as concerns the end of the rapid return movement. It cuts out in particular the jerks which may arise at the moment at which the carriage stops and at which the nut 20 which was revolving rapidly to provide said speedy return movement of the carriage drops suddenly to its speed of synchronized movement with the master screw 14.

As far as the mechanisms contained inside the horizontal section 58 of the control box are concerned, the latter are constituted by two clearly separate sections, of which one is held fast against rotation, while the other is capable of being driven into rotation by the motor 17. Last-mentioned section includes chiefly a casing 65 inside which is housed a nut 20, the connection between said parts being ensured for instance through screws 66. The casing 65 is preferably formed with the pulley 63 and is fitted inside the bore of the inner race 67 of a ball bearing, the outer race 68 of which is fitted in its turn in the horizontal section 58 of the control box. A stop 69 screwed inside the same section of the casing 65 prevents any longitudinal movement of the system rigid with the nut. Said system also includes a member 70 which is secured thereto by a clamping nut 71 and provides for cooperation with the clutch member 22.

As to the elements held against rotation which are carried in the horizontal section of the control box, reference is made to FIG. 7 which shows cross-sectionally the section 58 of the the control box with its extension 73 secured thereto for instance by screws 72 and closed by the rear vertical wall 56. Between the bottom or extension 73 and the actual casing section 58 is inserted an inwardly splined annulus 74.

Said FIG. 7 also shows the rotary race 67 and the stationary race 68 of the ball bearing, together with the casing 65 carrying the nut 20, the stop 69 for the rotary parts and the member 70 cooperating with the clutch 22 and locked in position by the locking nut 71. The clutch member 22 is held by the grooves or splines in the annulus 74, so that it is allowed to execute a longitudinal movement under the control of the tensioned spring 24', on the one hand, and of the electro-magnetic windings 76 forming the electro-magnet 24, on the other hand.

The securing of the electro-magnet 24 is ensured by screws 77 fitted in a vertical partition 78 rigid with the box or extension 73. Furthermore, the movable armature 79 of the electro-magnet is rigid with the clutch member 22 to which it is secured by the screws 80. The centering of the clutch is ensured by a cylindrical element 81 through which the master screw 14 passes and which is rigidly secured to the vertical partition 78 of the casing, as provided for instance by the screw 82, It is apparent from examination of said FIG. 7 that energization of the windings 76 produces a shifting towards the right-hand side of the clutch member 22 and, thereby, a release of the nut 20. In contradistinction, deenergization of the windings 76 allows the spring 24' to ensure engagement of the clutch, whereby the nut is held fast against rotation.

It should be remarked that the clutch member 22 is to cooperate with the member 70 through means which allow engagement of the clutch only for a single predetermined angular setting of the latter. The cooperating surfaces of said parts include for instance a single projecting element and a single reentrant element, the developed length of said elements being different. This arrangement has for its object to always stop the nut in the same angular position which is that required for the beginning of the thread-cutting operation.

FIG. 8 is a cross-section of the control box 16. It is apparent that said control box is secured to the part 83 of the bed through the agency of a plurality of screws for instance, of which two are shown at 84 and 85, the screw 85 holding furthermore in position a locking element 86.

Said FIG. 8 shows also the torque-limiting device 26', the driving pulley 61, the silent chain 62, the driven pulley 63 through which the master screw 14 passes coaxially and also the chain-tensioning means 64 mounted in a slideway 87 formed in a plate 88, so that said tensioning means may slide horizontally, as required for tensioning the chain.

Turning now to FIG. 9, the latter shows the driving mechanism connecting the camshaft 8 with the depth-defining cam 10, the cam 11 controlling the inward and receding movements of the tool and the auxiliary cam 30. The camshaft 8 is carried through the agency of a ball bearing 89 by an element rigid with the transverse carriage. The camshaft carries in its turn a cylindrical socket 91 which rotates in unison with said camshaft, as provided by a key 92, the socket being secured to the shaft by an axially extending screw 93. Said socket is provided with a bore 94 inside which is housed the tensioning spring 13' which provides for the disengagement of the clutch member 12, said clutch member rotating in unison with the socket 91 over which it is fitted through the splines 95.

On the other hand, there is secured to the vertical wall 96 of the transverse carriage 6 an electro-magnet 13 held on said surface by the screws 97 for instance. The winding 98 of the electro-magnet cooperates with an armature 32 secured by screws 97' to a socket 99 with said socket 99 being inserted endwise over the clutch member 12 with the interposition of a ball bearing 100 secured by a nut 101. These different parts are protected by a cap 102 secured by screws 103 for instance over the front wall 96 of the frame of the transverse carriage.

Furthermore, the cam-carrying casing 29 is revolubly mounted on the socket 91 through the agency of the roller bearings 104 and 105. Said cam-carrying casing carries the element 12' cooperating with the clutch member 12 and the cams 10, 11 and 30 which are held in position by the screws 106 and 107. The cam 10 cooperates with the cam follower 10', while the cam 11 cooperates with the cam follower 11' with the rollers transmitting the control movement to the transverse tool-holder.

It will be readily understood that while the camshaft 8 rotates, the cams 10, 11 and 30 are driven by the movement of the camshaft only when the winding 98 of the electro-magnet is fed with current and attracts the armature 32, and this has for its result a reengagement against the thrust of the spring 13' of the clutch member 12 with the cooperating member 12' fitted on the cam-carrying casing. Conversely, when the winding is deenergized, the spring 13' urges the different parts into the position illustrated in FIG. 9 for which the cams are not driven.

The clutch members 12 and 12' are constituted simply in the present case by surfaces ensuring a sufficient friction, without it being necessary to provide for constancy of the relative angular position of said parts.

Obviously, the arrangements which have just been described by way of examples may be replaced by equivalent means, without unduly widening thereby the scope of the invention as defined in the accompanying claims. As a matter of fact, the invention is obtained each time the camshaft of a thread-cutting machine is adapted to drive a master screw cooperating with a nut which is either held against rotation or driven in the same direction as the master screw and at a higher speed, it being understood that the camshaft is selectively caused to ensure the drive of the cams and to be inoperative with reference to the latter.

What I claim is:

1. A thread-cutting machine, chiefly for cutting threads of a considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, means for longitudinally shifting and holding fast said control box with reference to the bed, a nut threadedly engaging the master screw and carried inside the control box, means adapted to lock said nut against rotation during rotation of the master screw, an electric motor adapted to drive into rotation said nut in the same direction as the master screw and at a higher speed than the latter to provide the return stroke of the tool-holder, means for disconnecting the cam-carrying box from the camshaft during the thread-cutting stroke of the tool-holder and the return movement of the tool-holder.

2. A thread-cutting machine, chiefly for cutting threads of considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the cam shaft, a control box through which the master screw extends and carried by the bed, a nut threadedly engaging the master screw and carried inside the control box, means adapted to lock said nut against rotation during the rotation of the master screw, an electric motor, a silent transmission chain interconnecting the electric motor with the nut to make the latter rotate at a speed higher than and in the same direction as the master screw during the return stroke of the tool-holder, tensioning means for said chain, means for disconnecting the cam-carrying box from the camshaft during the thread-cutting stroke of the tool-holder and the return movement of the tool-holder.

3. A thread-cutting machine, chiefly for cutting threads of a considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means through which the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the cam shaft, a control box through which the master screw extends and carried by the bed, a nut threadedly engaging the master screw and carried inside the control box, means adapted to lock the nut against rotation during rotation of the master screw, an electric motor adapted to drive into rotation said nut in the same direction as the master screw and at a higher speed than the latter to provide the return stroke of the tool-holder, torque-limiting means inserted between the nut and the electric motor, means for disconnecting the cam-carrying box from the camshaft during the thread-cutting stroke of the tool-holder and the return movement of the tool-holder.

4. A thread-cutting machine, chiefly for cutting threads of a considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means through which the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, a nut threadedly engaging the master screw, a casing inside which said nut is housed inside the control box and through which the master screw passes, an electric motor, a driving pulley operatively inserted between the motor and the nut and carried by the nut casing, adapted to drive into a rotation said nut in the same direction as the master screw and at a higher speed than the latter to provide the return stroke of the tool-holder, a clutch adapted to hold said driving pulley fast against rotation during the thread-cutting stroke of the tool-holder and including a member rigid with the nut casing and a member rigid with said pulley, and means for disconnecting the cam-carrying box from the camshaft during the thread-cutting stroke and return stroke of the tool-holder.

5. A thread-cutting machine, chiefly for cutting threads of a considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, a nut threadedly engaging the master screw, a casing inside which said nut is housed inside the control box and through which the master screw passes, a ball bearing fitted between the nut casing and the control box, an electric motor, a driving pulley operatively connected between the motor and the nut and carried by the nut casing, adapted to drive into rotation said nut in the same direction as the master screw and at a higher speed than the latter to provide the return stroke of the tool-holder, a clutch adapted to hold said driving pulley fast against rotation during the thread-cutting stroke of the tool-holder and including a member rigid with the nut casing and a member rigid with said pulley, and means for disconnecting the cam-carrying box from the camshaft during the thread-cutting stroke and return stroke of the tool-holder.

6. A thread-cutting machine, chiefly for cutting threads of a considerable length, comprising a headstock, a tailstock alined with the headstock, a bed carrying said headstock and tailstock, a carriage slidingly carried by said bed to slide in the direction defined by the alined headstock and tailstock, a tool-holder carried by said carriage to move forwardly therewith during the thread-cutting stroke and then to execute a rearward stroke, a camshaft revolubly carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, a nut threadedly engaging the master screw and carried inside the control box, an electro-magnet, a clutch member forming the armature of the latter and adapted to hold the nut fast during the thread-cutting stroke and carried inside the control box, the control box and the clutch member engaging each other slidingly along guiding splines extending longitudinally in parallelism with the axis of the headstock, an electric motor adapted to drive into rotation said nut in the same direction as the master screw and at a higher speed than the latter to provide the return stroke of the tool-holder, means for disconnecting the cam-carrying box from the camshaft during the thread-cutting stroke of the tool-holder and the return movement of same.

7. A thread-cutting machine, chiefly for cutting threads of a considerable length, comprising a headstock, a tailstock alined with the headstock, a bed carrying said headstock and tailstock, a carriage slidingly carried by the bed to slide in the direction defined by the alined headstock and tailstock, a tool-holder carried by said carriage to move forwardly during the thread-cutting stroke and then to execute a rearward stroke, a camshaft revolubly carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, a nut threadedly engaging the master screw and carried inside the control box, means adapted to lock said nut against rotation during rotation of the master screw, an electric motor adapted to drive into rotation said nut in the same direction as the master screw and at a higher speed than the latter to provide the return stroke of the tool-holder, a sleeve carried at the end of the camshaft and on which the cam box is revolubly carried, an electro-magnet, an armature for the latter, a clutch member controlled by the electro-magnet armature and adapted to disconnect the cam box from the cam shaft during the thread-cutting and return strokes and means for guiding the cam box longitudinally over the clutch member.

8. A thread-cutting machine, chiefly for cutting threads of a considerable length, comprising a headstock, a tailstock alined with the headstock, a bed carrying said headstock, a carriage slidingly carried by the bed to slide in the direction defined by the alined headstock and tailstock, a tool-holder carried by said carriage to move forwardly during the thread-cutting stroke and then to execute a rearward stroke, a camshaft revolably carried by the carriage on an axis parallel with the axis of the headstock and tailstock, means wherethrough the camshaft is driven by the headstock, a depth-defining cam for the tool on the tool-holder and a cam defining the inward and receding movements of the tool-holder, a box carrying said cams and driven by the camshaft, a master screw forming a coaxial extension of the camshaft and controlling the sliding movement of the carriage over the bed, releasable means interconnecting the master screw with the camshaft, a control box through which the master screw extends and carried by the bed, a nut threadedly engaging the master screw and carried inside the control box, means adapted to lock the nut against rotation during the rotation of the master screw, an electric motor adapted to drive into rotation said nut in the same direction as the master screw and at a higher speed than the latter to provide the return stroke of the tool-holder, a sleeve carried at the end of the camshaft and on which the cam box is revolably carried, an electro-magnet, an armature for the latter, a clutch member controlled by the electro-magnet armature and adapted to disconnect the cam box from the camshaft during the thread-cutting and return strokes, means including a ball bearing fitted between last-mentioned clutch and the armature of the electro-magnet controlling said clutch and holding same in their relative longitudinal position.

9. A thread-cutting machine, chiefly for cutting threads of a considerable length, comprising a headstock, a tailstock being alined with said headstock, a bed carrying said headstock and tailstock, a carriage slidably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means operatively connected to said headstock for driving said camshaft, a depth-defining cam for controlling the depth of engagement of the tool on said tool-holder with the work piece, a cam for controlling and defining the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means interconnecting said master screw with said camshaft, a control box having said master screw extending therethrough and being carried by said bed, a nut threadedly engaging said master screw and being carried inside said control box, means for locking said nut against rotation during rotation of said master screw, driving means operatively connected to said nut for rotating said nut in the same direction as said master screw and at a higher speed than the latter to provide the return stroke of said tool-holder, means for disconnecting said cam-carrying box from said camshaft during the thread-cutting stroke of said tool-holder and the return stroke of said tool-holder.

10. A thread-cutting machine, chiefly for cutting threads of a considerable length, comprising a headstock, a tailstock being in alinement with said headstock, a bed carrying said headstock and tailstock, a carriage slideably carried by said bed for sliding in the direction defined by said alined headstock and tailstock, a tool-holder being carried by said carriage, a camshaft rotatably carried by said carriage on an axis parallel with the axis of said headstock and tailstock, means operatively connected to said headstock for driving said camshaft, a depth-defining cam for controlling the depth of engagement of the tool on said tool-holder with the workpiece, a cam for controlling and defining the inward and receding movements of said tool-holder, a box carrying said cams for being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means interconnecting said master screw with said camshaft, a control box having said master screw extending therethrough and being carried by said bed, a nut threadedly engaging said master screw and being carried inside said control box, a clutch capable of holding said nut fast against rotation during the thread-cutting stroke of said tool-holder, and electro-magnet controlling said clutch, an electric motor operatively connected to said nut for rotating the same in the same direction as said master screw and at a higher speed than the latter to provide the return stroke of said tool holder, means for disconnecting said cam-carrying box from said camshaft during the thread-cutting stroke of said tool-holder and the return stroke of said tool-holder and a source of electrical current for said motor and said electro-magnet.

11. A thread-cutting machine, chiefly for cutting threads of a considerable length, comprising a headstock, a tailstock being in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means for operatively connecting said camshaft to said headstock for being driven thereby, a depth-defining cam for controlling the depth of engagement of the tool on said tool-holder with the work piece, a cam for controlling and defining the inward and receding movements of said tool-holder, a box carrying said cams being connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachable interconnecting said master screw with said camshaft, a control box having said master screw extending therethrough and being carried by said bed, a nut threadedly engaging said master screw and being carried inside said control box, means for locking said nut against rotation during rotation of said master screw, an electric motor operatively connected to said nut for rotating the same in the same direction as said master screw and at a higher speed than the latter to provide the return stroke of said tool-holder, a clutch for disconnecting said cam-carrying box from said camshaft during the thread-cutting and return strokes of said tool-holder, an electromagnet controlling said clutch and a source of electrical current for said motor and said electro-magnet.

12. A thread-cutting machine, chiefly for cutting threads of a considerable length, comprising a headstock, a tailstock being in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means for operatively connecting said camshaft to said headstock for being driven thereby, a depth-defining cam for controlling the depth of engagement of the tool on said tool-holder with the work piece, a cam for controlling and defining the inward and receding movements of said tool-holder, a box carrying said cams being connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, a clutch for holding said nut fast against rotation during the thread-cutting stroke of said tool-holder, an electromagnet controlling said clutch, an electric motor operatively connected to said nut for rotating the same in the same direction as said master screw and at a higher speed than the latter to provide the return stroke of said tool-holder, a second clutch for disconnecting said cam-carrying box with reference to said camshaft during the thread-cutting and return strokes of said tool-holder, an electro-magnet controlling said second clutch, relays controlling the operation of the two electro-magnets and of the electric motor in accordance with a predetermined schedule, an electrical circuit connecting said motor, electro-magnets and relays and a source of electric current connected to said circuit.

13. A thread-cutting machine, chiefly for cutting threads of a considerable length, comprising a headstock, a tailstock being in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, a depth-defining cam for controlling the depth of engagement of the tool on said tool-holder with the work piece, a cam for controlling and defining the forward and receding movements of said tool-holder, a box carrying said cams being connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, a clutch for holding said nut fast against rotation for a single predetermined angular position during the thread-cutting stroke of said tool-holder, an electro-magnet controlling said clutch, an electric motor operatively connected to said nut for rotating the same in the same direction as said master screw and at a higher speed than the latter to provide the return stroke of said tool-holder, a second clutch for disconnecting said cam-carrying box with reference to said camshaft during the thread-cutting and return strokes of said tool-holder, an electro-magnet controlling said second clutch, relays controlling the operation of said electro-magnets and of said electric motor in accordance with a predetermined schedule, adjustable feelers carried by said carriage, stationary microswitches cooperating with said adjustable feelers and controlling the operation of said relays, an auxiliary cam being carried by said cam-carrying box, a second pair of microswitches operatively engaging said auxiliary cam each controlling one of said relays, an electrical circuit connecting said motor, electro-magnets, relays and microswitches and a source of electrical current connected to said circuit.

14. A thread-cutting machine, chiefly for cutting threads of a considerable length, comprising a headstock, a tailstock being in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, a depth-defining cam for controlling the depth of engagement of the tool on the said tool-holder with the work piece, a cam for controlling and defining the inward and receding movements of said tool-holder, a box carrying said cams being connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, a clutch for holding said nut fast against rotation for a single predetermined angular position during the thread-cutting stroke of said tool-holder, an electro-magnet controlling said clutch, an electric motor operatively connected to said nut for rotating the same in the same direction as said master screw and at a higher speed than the latter to provide the return stroke of said tool-holder, a second clutch for disconnecting said cam-carrying box with reference to said camshaft during the thread-cutting and return strokes of said tool-holder, an electro-magnet controlling said second clutch, relays controlling the operation of said electro-magnets and of said electric motor in accordance with a predetermined schedule, feelers adjustably carried by said carriage, two microswitches operating upon arrival of said carriage at the end of its operative thread-cutting and return strokes respectively through engagement with said adjustable feelers, an auxiliary cam being carried by said box carrying said two above-mentioned cams, two further microswitches operated by said auxiliary cam each controlling one of said relays for at times stopping the rotation of said tool controlling cams and said carriage, an electrical circuit connecting said motor, electro-magnets, relays, microswitches and a source of electrical current connected to said circuit.

15. A thread-cutting machine, chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means operatively connected to said headstock for driving said camshaft, a depth-defining cam for controlling the depth of engagement of said toolholder, a cam for controlling and defining the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending and being carried by said bed, means for longitudinally shifting and holding fast said control box with reference to said bed, a nut threadedly engaging said master screw and being carried inside said control box, means for locking said nut against rotation during rotation of said master screw, an electric motor operatively connected to said nut for rotating the same in the same direction as said master screw and at a higher speed than the latter to provide the return stroke of said tool-holder, means for disconnecting said cam-carrying box from said camshaft during the thread-cutting stroke of said tool-holder and the return movement of said tool-holder and a source of electrical current connected to said motor.

16. A thread-cutting machine, chiefly for cutting threads of considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage to move forwardly therewith during the thread-cutting stroke and then for executing a rearward stroke, a camshaft rotatably carried by said carriage on an axis parallel with the axis of said headstock and tailstock, means operatively connected to said headstock for driving said camshaft, a depth-defining cam for controlling the depth of engagement of the tool on said toolholder with the work piece, a cam for controlling and defining the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw extending therethrough and being carried by said bed, a nut threadedly engaging said master screw and being carried inside said control box, means for locking said nut against rotation during the rotation of said master screw, an electric motor, transmission means interconnecting said electric motor with said nut to make the latter rotate at a speed higher than and in the same direction as said master screw during the return stroke of said tool-holder, and means for disconnecting said cam-carrying box from said camshaft during the thread-cutting stroke of said tool-holder and the return movement of said tool-holder.

17. A thread-cutting machine, chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means operatively connected to said headstock for driving said camshaft, a depth-defining cam for controlling the depth of engagement of the tool on said tool-holder with the work piece, a cam defining the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, means for locking said nut against rotation during rotation of said master screw, an electric motor operatively connected to said nut for rotating the same in the same direction as said master screw and at a higher speed than the latter to provide the return stroke of said tool-holder, torque-limiting means inserted in the connection between said nut and said electric motor, means for disconnecting said cam-carrying box from said camshaft during the thread-cutting stroke of said tool-holder and the return movement of said tool-holder and a source of electrical current for said motor.

18. A thread-cutting machine chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and said camshaft for driving said camshaft, a depth-defining cam for controlling the depth of engagement of the tool on said tool-holder with the work piece, a cam for controlling and defining the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw, a casing inside said control box housing and connected to said nut while having said master screw extending therethrough, an electric motor, a source of electrical current connected to said motor, a driving pulley connected to said motor for being driven thereby, an endless belt extending around said pulley, a driven pulley having said belt extending therearound and being carried by said nut casing for rotating said nut in the same direction as said master screw and at a higher speed than the latter to provide the return stroke of said tool-holder, a clutch adapted to hold said driven pulley fast against rotation during the thread-cutting stroke of said tool-holder and including a member rigid with said nut casing and a member rigid with said driven pulley, and means for disconnecting said cam-carrying box from said camshaft during the thread-cutting stroke and return stroke of said tool-holder.

19. A thread-cutting machine, chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage for moving forwardly therewith during the thread-cutting stroke and then for executing a rearward stroke, a camshaft rotatably carried by said carriage on an axis parallel with the axis of said headstock and tailstock, means for driving said camshaft being operatively connected to said headstock for being driven thereby, a depth-defining cam for controlling the depth of engagement of the tool on said tool-holder with the work piece, a cam for controlling and defining the inward and receding movements of said tool-holder, a box carrying said cams being detachably connected to said camshaft for being driven thereby at the end of the threading stroke of said tool and at the end of the return stroke of said carriage whereby said tools controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw, a casing inside said control box housing and connected to said nut while having said master screw extending therethrough, a ball bearing being mounted between said nut casing and said control box, an electric motor, a source of electrical current connected to said motor, a driven pulley operatively connected to said motor and said nut and being carried by said nut casing for driving said nut into rotation in the same direction as said master screw and at a higher speed than the latter to provide the return stroke of said tool-holder, a clutch for holding said driven pulley fast against rotation during the thread-cutting stroke of said tool-holder and including a member rigid with said nut casing and a member rigid with said pulley, and means for disconnecting said cam-carrying box from said camshaft during the thread-cutting stroke and return stroke of said tool-holder.

20. A thread-cutting machine, chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a toolholder being carried by said carriage for moving forwardly therewith during the thread-cutting stroke and then for executing a rearward stroke, a camshaft rotatably carried by said carriage on an axis parallel with the axis of said headstock and tailstock, means for driving said camshaft being operatively connected to said headstock, a depth-defining cam for controlling the depth of engagement of the tool on said tool-holder with the work piece, a cam defining and controlling the inward and receding movements of said toolholder, a box carrying said cams being detachably connetced to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, an electro-magnet, a clutch member forming the armature of said electro-magnet and capable of holding said nut fast during the thread-cutting stroke and being carried inside said control box, guiding splines having said control box and said clutch member engaging each other slidingly therealong in a direction extending longitudinally in parallelism with the axis of said headstock, an electric motor operatively connected to said nut for rotating the same in the same direction as said master screw and at a higher speed than the latter to provide the return stroke of said tool-holder, means for disconnecting said cam-carrying box from said camshaft during the thread-cutting stroke of said toolholder and the return movement of said tool-holder, and a source of electrical current connected to said motor.

21. A thread-cutting machine, chiefly for cutting threads of a considerable length, comprising a headstock, a tailstock in alinement with said headstock, a bed carrying said headstock and tailstock, a carriage slideably carried by said bed for sliding in the direction defined by said alined headstock and tailstock, a tool-holder being carried by said carriage for moving forwardly during the thread-cutting stroke and then for executing a rearward stroke, a camshaft rotatably carried by said carriage on an axis parallel with the axis of said headstock and tailstock, means operatively connected to said headstock and for thereby driving said camshaft, a depth-defining cam for controlling the depth of engagement of the tool of said tool-holder with the work piece, a cam defining and controlling inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw extending therethrough and being carried by said bed, a nut threadedly engaging said master screw, an electric motor operatively connected to said nut for rotating the same in the same direction as said master screw and at a higher speed than the latter to provide the return stroke of said tool-holder, a sleeve being carried at the end of said camshaft and on which said cam box is revolubly carried, an electro-magnet, an armature for said electro-magnet, a clutch member operatively connected to said electro-magnet armature for being controlled thereby and capable of disconnecting said camshaft during the thread-cutting and return strokes, means for guiding said cam box longitudinally over said clutch member and a source of electrical current connected to said motor and said electro-magnet.

22. A thread-cutting machine, chiefly for cutting threads of a considerable length, comprising a headstock, a tailstock in alinement with said headstock, a bed carrying said headstock, a carriage slideably carried by said bed for sliding in the direction defined by said alined headstock and tailstock, a tool-holder being carried by said carriage for moving forwardly during the thread-cutting stroke and then for executing a rearward stroke, a camshaft rotatably carried by said carriage on an axis parallel with the axis of said headstock and tailstock, means connecting said camshaft to said headstock for being driven thereby, a depth-defining cam for controlling the depth of engagement of the tool on said tool-holder with the work piece, a cam defining and controlling the inward and receding movements of said tool-holder, a box carrying said cams being detachably connected to said camshaft for being driven thereby at the end of the threading stroke of said tool and at the end of the return stroke of said carriage whereby said tool controlling cams are operative to withdraw said tool from the work piece and then project the tool for a deeper cut, a master screw forming a coaxial extension of said camshaft and controlling the sliding movement of said carriage over said bed, releasable means detachably interconnecting said master screw with said camshaft, a control box having said master screw extending therethrough and being carried by said bed, a nut threadedly engaging said master screw and being carried inside said control box, means for locking said nut against rotation during the rotation of said master screw, an electric motor operatively connected to said nut for rotating the same in the same direction as said master screw and at a higher speed than the latter to provide the return stroke of said tool-holder, a sleeve being carried at an end of said camshaft and having said cam box rotatably mounted thereon, an electro-magnet, an armature for said electro-magnet, a clutch member operatively connected to said electro-magnet armature for being controlled thereby and capable of disconnecting said cam box from said camshaft during the thread-cutting and return strokes, means including a ball bearing fitted between said clutch and said armature of said electro-magnet controlling said clutch and for holding same in their relative longitudinal position and a source of electrical current connected to said motor and said electro-magnet.

References Cited in the file of this patent
UNITED STATES PATENTS

| | | |
|---|---|---|
| 1,309,389 | Yeomans | July 8, 1919 |
| 2,177,319 | Hall | Oct. 24, 1939 |
| 2,808,598 | Mannaioni | Oct. 8, 1957 |